(12) United States Patent
Cerniglia

(10) Patent No.: US 12,049,034 B2
(45) Date of Patent: Jul. 30, 2024

(54) ANGLE PIN BUSHING AND INJECTION MOLD SLIDE HAVING SAME

(71) Applicant: Anthony Cerniglia, Wauconda, IL (US)

(72) Inventor: Anthony Cerniglia, Wauconda, IL (US)

( * ) Notice: Subject to any disclaimer, the term of this patent is extended or adjusted under 35 U.S.C. 154(b) by 265 days.

(21) Appl. No.: 16/541,075

(22) Filed: Aug. 14, 2019

(65) Prior Publication Data

US 2020/0055222 A1 Feb. 20, 2020

Related U.S. Application Data

(60) Provisional application No. 62/718,470, filed on Aug. 14, 2018.

(51) Int. Cl.
B29C 45/33 (2006.01)

(52) U.S. Cl.
CPC .................................. *B29C 45/33* (2013.01)

(58) Field of Classification Search
CPC ......... B29C 45/33; B29C 45/03; B29C 45/26; B29C 45/00; B29C 45/04; B29C 45/0408; B29C 45/07; B29C 45/1761; B29C 45/2606; B29C 45/2735; B29C 45/28; B29C 45/332; B29C 45/4421; B29C 33/00; B29C 33/20; B29C 33/22; B29C 33/30; B29C 33/34; B29C 2045/0491; B29C 2045/14131; B29C 2045/14967;

(Continued)

(56) References Cited

U.S. PATENT DOCUMENTS 3,516,302 A * 6/1970 Muttart .............. B22D 17/2236
  249/67
4,009,979 A * 3/1977 Martin ................ B29C 45/4005
  425/444

(Continued)

FOREIGN PATENT DOCUMENTS

| CN | 104786445 A | 7/2015 |
|---|---|---|
| JP | H0985786 A | 3/1997 |
| KR | 20040101185 A | 12/2004 |

OTHER PUBLICATIONS

ISR 11122019, International Search Report cited in corresponding International Application No. PCT/US19/46572; dated Nov. 12, 2019; 3pp.

(Continued)

*Primary Examiner* — Robert B Davis
(74) *Attorney, Agent, or Firm* — Lempia Summerfield Katz LLC

(57) ABSTRACT

A mold slide has a slide part with a slide body movable along a first direction. The slide body has an angle pin hole formed therein and defines an axis. The angle pin hole has a pocket at one end thereof. An angle pin bushing is seated in the pocket and defines an angle pin bore that is parallel to the axis of the angle pin hole. A mold part is adjacent to the slide part and movable relative to the slide part along a second direction different from the first direction. An angle pin is carried on the mold part. A portion of the angle pin is positioned in and movable in concert with the mold part relative to the angle pin bore in the angle pin bushing to move the slide part along the first direction.

18 Claims, 19 Drawing Sheets

(58) Field of Classification Search
CPC .. B29C 2045/14975; B29C 2045/2855; B29C 2045/2889

See application file for complete search history.

(56) References Cited

U.S. PATENT DOCUMENTS

| | | | | |
|---|---|---|---|---|
| 4,052,033 | A * | 10/1977 | Taylor | B29C 45/4005 249/67 |
| 4,483,268 | A * | 11/1984 | Pichl | B63B 5/24 114/65 R |
| 4,502,660 | A * | 3/1985 | Luther | B29C 45/4421 425/441 |
| 4,765,585 | A | 8/1988 | Wieder | |
| 4,768,747 | A * | 9/1988 | Williams | B29C 33/48 425/468 |
| 4,828,480 | A | 5/1989 | Smith | |
| 5,234,329 | A * | 8/1993 | Vandenberg | B29C 45/332 425/441 |
| 5,407,344 | A | 4/1995 | Rombalski, Jr. | |
| 5,431,556 | A * | 7/1995 | Luther | B29C 45/2628 264/318 |
| 5,880,043 | A * | 3/1999 | Lorenz | B32B 27/04 428/408 |
| 5,882,695 | A * | 3/1999 | Starkey | B29C 45/2606 425/168 |
| 6,364,654 | B1 | 4/2002 | Luther | |
| 6,398,541 | B1 * | 6/2002 | Seres, Jr | B29C 45/2711 425/549 |
| 6,431,852 | B1 | 8/2002 | Vandenberg | |
| 6,877,974 | B2 * | 4/2005 | Puniello | B29C 45/14819 425/577 |
| 7,175,421 | B2 | 2/2007 | Takemoto et al. | |
| 8,371,842 | B2 | 2/2013 | Li | |
| 8,459,332 | B1 | 6/2013 | Oconnor | |
| 8,770,844 | B2 | 7/2014 | Masse | |
| 9,649,784 | B2 | 5/2017 | Masini | |
| 10,744,672 | B2 * | 8/2020 | Germain | B29C 45/332 425/577 |
| 2002/0025359 | A1 * | 2/2002 | Navarra-Pruna | B29C 45/332 425/441 |
| 2003/0146551 | A1 * | 8/2003 | Weeks | B29C 49/50 425/527 |
| 2004/0207108 | A1 * | 10/2004 | Pacchiana | B29C 43/361 425/468 |
| 2004/0247726 | A1 * | 12/2004 | Takemoto | B29C 45/332 425/577 |
| 2008/0124425 | A1 * | 5/2008 | Chen | B29C 45/332 425/545 |
| 2009/0020915 | A1 * | 1/2009 | Mai | B29C 33/76 425/577 |
| 2009/0263528 | A1 * | 10/2009 | Cerniglia | B22D 17/2236 249/67 |
| 2010/0209547 | A1 * | 8/2010 | Heissler | B63B 5/24 114/65 R |
| 2012/0082752 | A1 | 4/2012 | Li | |
| 2013/0064483 | A1 | 3/2013 | Masse et al. | |
| 2014/0335220 | A1 | 11/2014 | Tseng | |

OTHER PUBLICATIONS

Written Opinion dated Nov. 12, 2019, Written Opinion of the International Searching Authority cited in corresponding International Application No. PCT/US19/46572; dated Nov. 12, 2019; 12 pp.

First Examination Report cited in corresponding Indian patent application No. 202117009947; Sep. 13, 2022; 8 pp.

Supplementary European Search Report cited in corresponding European patent application No. 19849769.5; Apr. 13, 2022; 12 pp.

Office Action cited in corresponding Japanese patent application No. 2021-507688; May 30, 2023; 10 pp.

Office Action cited in corresponding Canadian patent application No. 3,109,469; Mar. 28, 2024; 7 pp.

* cited by examiner

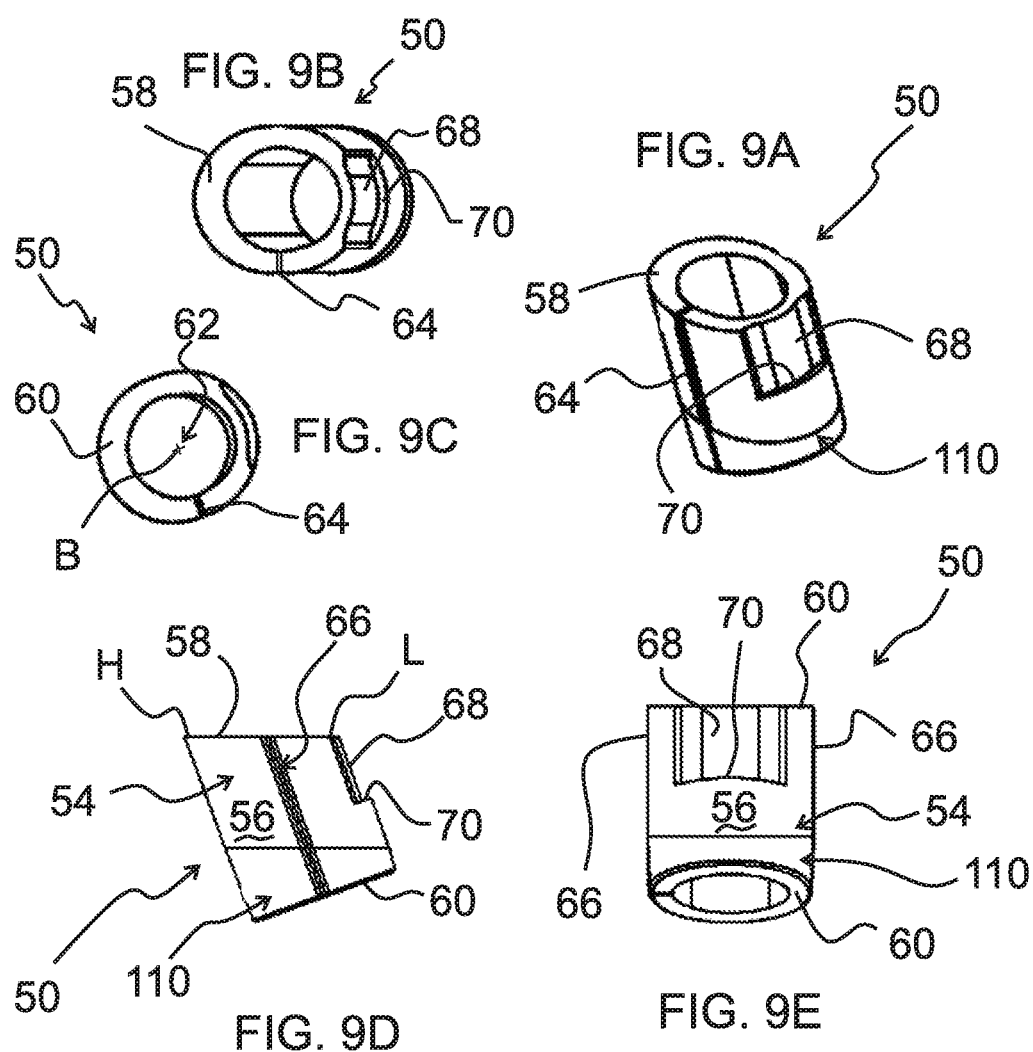

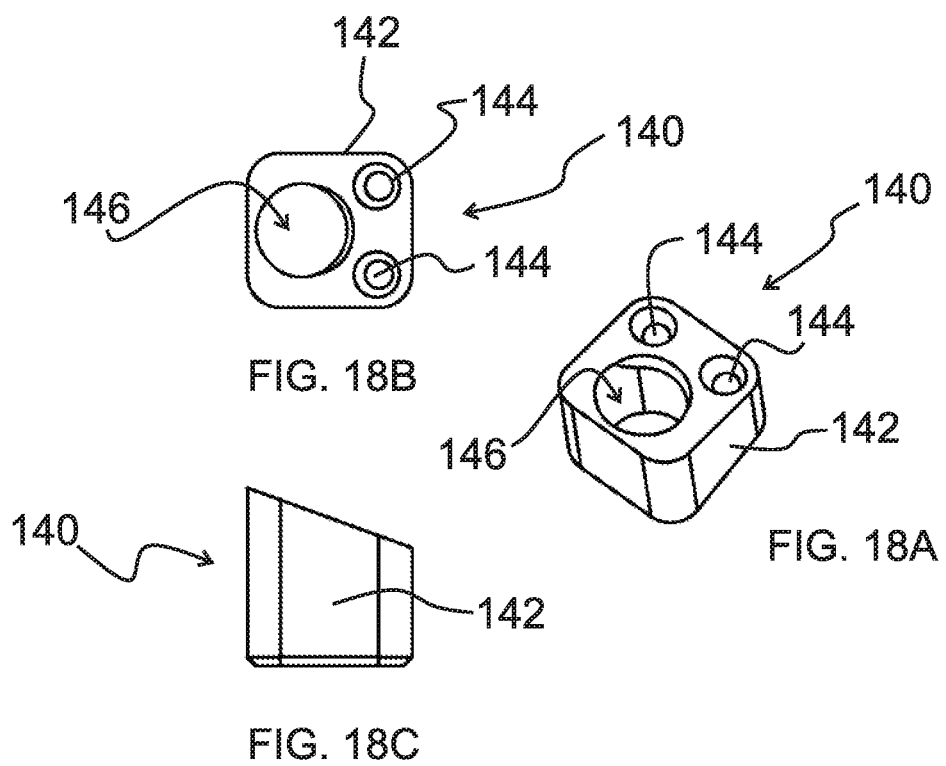

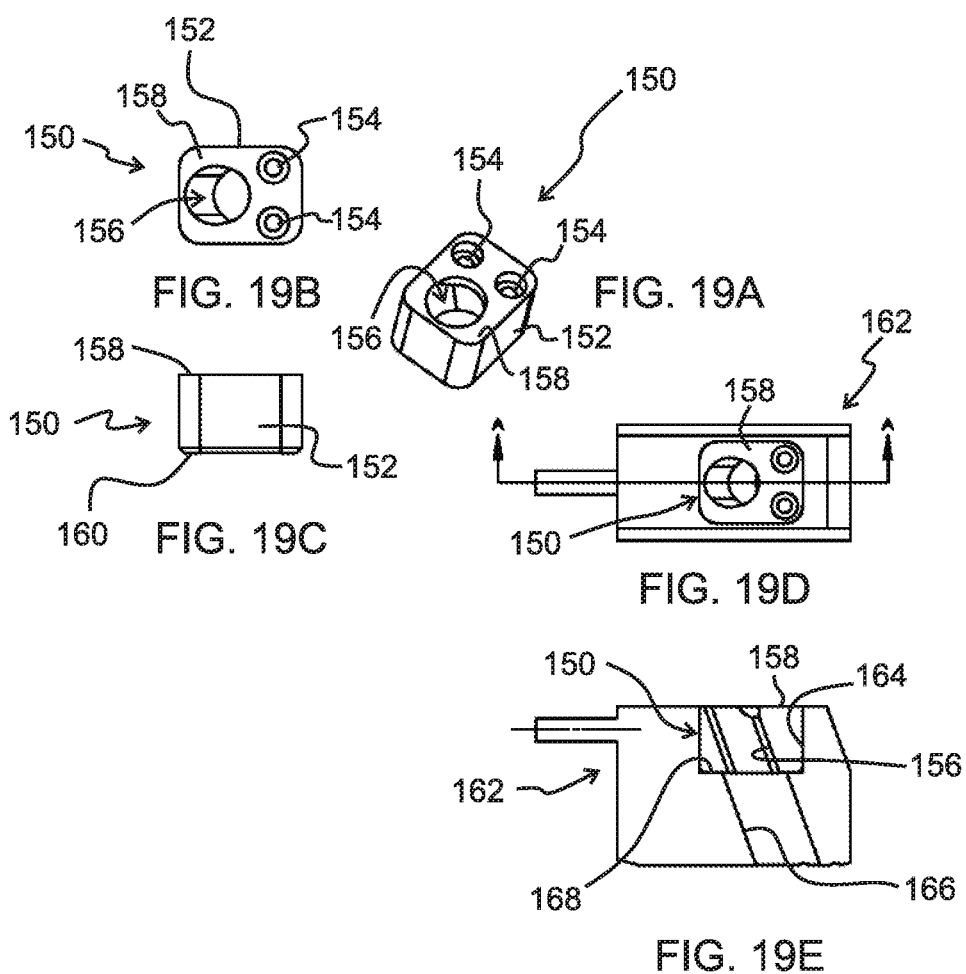

ANGLE PIN BUSHING AND INJECTION MOLD SLIDE HAVING SAME

RELATED APPLICATION DATA

This patent is entitled to the benefit of and claims priority to U.S. Provisional Application Ser. No. 62/718,470 filed Aug. 14, 2018 and entitled "Angle Pin Bushing and Injection Mold Slide Having Same." The entire contents of this prior filed application are hereby incorporated herein by reference.

BACKGROUND

1. Field of the Disclosure

The present disclosure is generally directed to injection molding equipment, and more particularly to side actions or slides for injection molding.

2. Description of Related Art

Many injection molded parts require what is commonly referred to as a side action or slide to remove coring geometry from the ejection path of a molded part. A common method of actuating this movement is to utilize what is known to the industry as an angle pin. Other common terms for such parts are cam pin, pecker pin, horn pin, or the like, and the terms depend on the region of manufacture. As the angle pin name suggests, this pin-like component is oriented at an angle relative to the normal axes of motion for the molding plates and slides. The pin installation angle and pin length combine to generate the desired movement or stroke of the slide to clear the ejection path of the now molded article from the cavities.

Referring to FIGS. 1-4, a typical side action or slide part, i.e., a slide 20 has a body 22 with a coring element 24 of some geometric form extending therefrom. The coring element 24 is used to form a void or desired surface or shape within a molded part. However, the coring element 24 lies in the part ejection path from the mold. Thus, the slide 20 is movable so that the coring element 24 can move toward the mold cavity prior to part formation and can be withdrawn from the mold cavity to permit the part to be ejected from the cavity and the mold. In some examples, the slide 20 has a slightly oversized round or circular shaped hole 26 in the body 22 for receiving an angle pin 28. As shown in FIGS. 5 and 6, a slide 30 is similar to the slide 20 in that it has a body 32 with a coring element 34 projecting from the body. However, in some examples, the slide 30 has an elongate, non-round, oval, or oblong shaped hole, i.e., a slot 36 in the body 32.

FIGS. 2 and 3 depict a generic mold construction that incorporates the slide 20. In this example, the mold includes a first mold half 40 and a second mold half 42 that are movable toward and away from one another in the direction of the arrows MC and MO, respectively, i.e., mold close and mold open. FIG. 2 shows the mold with the mold halves 40, 42 closed and FIG. 3 shows the mold with the mold halves open. The mold halves 40, 42 define a mold cavity 44, which can form a molded part in the closed position of FIG. 2, and which can eject the molded part in the open position of FIG. 3. The angle pin 28 has a proximal end mounted to the mold half 42 through an opening 46 in the second mold half. A distal or working end 48 of the angle pin 28 protrudes from the second mold half to engage the slide 20. As shown in FIG. 2, with the mold halves 40, 42 closed, the coring element 24 extends into the mold cavity 44 to form a void, space, or other shape in a molded part. The coring element 24 must move out of the way to clear the mold cavity 44. The working end 48 of the angle pin 28 and the hole 26 in this example, move the slide 20 in a direction perpendicular to the mold open/close directions MO/MC. Thus, the coring element 24 is simultaneously moved outward from the cavity 44 as the mold halves 40, 42 are separated in the direction MO to the open position of FIG. 3, allowing for the molded part to be ejected from the cavity 44.

While both the hole 26 and the slot 36 are cut at an angle that matches the angle pin 28 installation angle, the hole 26 diameter or slot 36 radius are always oversized so that the motion, i.e., the stroke S of the slide 20 (or 30) can be achieved, as depicted in FIGS. 2 and 3. This is typically referenced as "fit" or "running fit". In the case of an angle pin 28 to hole 26 or slot 36 geometry, this running fit is very loose by virtually any standard so as not to add additional force requirements to facilitate the mold opening process. This conventional loose fit is depicted in FIGS. 4 and 6. This loose fit also allows for pin deflection without binding and breaking the angle pin 28 under load. Again, depending on the region of manufacture, the typical hole size could be 1/64 inch-1/32 inch larger in diameter than the diameter of the angle pin 28.

As mentioned earlier, it is sometimes desirable to machine an elongated slot 36 in a slide 30 rather than an oversized hole 26, as depicted in FIGS. 5 and 6. The purpose for this slot 36 geometry is to add a significant or a predetermined delay, i.e., a lost motion effect, to the transverse motion of the slide 30 relative to the separation of the mold halves 40, 42 and removal of the coring element 34 in relation to the mold opening sequence in the direction MO. Adding this motion delay or lost motion can improve the mold cycle time, as the coring element 34 of the slide 30 assists the natural shrinkage and adhesion of a cooling molded part by holding the part to the ejection half 40 of the mold. The typical slot 36 geometry is an oval. The oval width would again be oversized by 1/64 inch-1/32 inch with a full, larger clearance oversized radius at each end of the slot. The slot length is elongate to the desired amount of mold half 40, 42 separation prior to angle pin 28 engagement, which would then move the slide 30.

It has been established that either the hole 26 or the oval slot 36 geometry utilized to engage with an angle pin 28 has an oversized internal surface geometry that is intentionally designed for simplicity of installation. The hole 26 or slot 36 is formed using a common drill and ream or milling process. While more sophisticated and accurate methods for installing or forming the angle pin hole geometry are known, the geometry itself is a legacy to machining practices available at the inception of mold tool building. This legacy geometry minimizes the surface contact area between the angle pin 28 and the slide hole 26 or slot 36 during operation. If one were to magnify the contact area between an oversized hole/slot radius relative to a nominal sized pin, as in the case of the angle pin 28, there would only be a tangential line of contact between the angle pin and the slide hole/slot geometry in line with the direction of movement, as depicted in FIGS. 4 and 6. This focuses the load to a minimal amount of surface area.

This minimal surface area that carries the load often generates enough frictional heat that galling of the angle pin 28, the slide 20 or 30, or both occurs during use. Additionally, the tangential line of contact will wear. While such wear can distribute the load over a greater surface area, the engineered motion is altered from the design intent as the surface contact is no longer at the engineered specification. Also, as depicted in FIG. 7, the angle pin 28 and hole 26 or slot 30 may not be at precisely the same angle relative to one another. This can cause undue loading or stress on the angle pin 28 as a result of the contact point being at or near the tip of the pin and not along a wear line over the length of the pin. These issues or problems can lead to increased maintenance and repair, such as replacing worn angle pins, repairing or replacing damaged slides, or replacing an angle pin with a larger diameter pin and revising the mold to accommodate the larger angle pin. Associated costs with repairs, revisions, and production loss can be quite substantial. Depending on the mold size and the repairs or replacement parts necessary, it is not be uncommon for these maintenance costs to be on the order of tens of thousands of dollars.

Due to the performance requirements of molding in general, today's molds or mold parts are mostly fabricated from steel and aluminum alloys. There are a variety of surface treatments that have been tried and applied to both steel and aluminum parts to try and extend their useful life cycle. Invariably, these metallic components require lubrication to assist smooth operation in production. However, adding lubricants to the equation creates another level of potential problems.

It is important to further understand the wide variety of environments in which injection molds are operated. Engineered resins can require mold temperatures of 450° F. while commodity resins need mold temperatures of only 60° F. Additionally, clean room molding is a segment of the molding community that is desired or required to mold parts that necessitate certain processes to mold parts for food packaging, medical devices, and other products minimizing potential dust, grease, and other contaminants during production. A clean room is a positive pressure room with air filters to minimize airborne contamination particulates. Prior to entry and for the duration of time spent within the clean room, all persons are required to wear gowns, hair and beard nets, shoe covers, and the like. Currently, food grade grease is used for lubrication in clean room molding operations. Food grade grease has very low performance characteristics with respect to pressure and heat tolerance, both of which can be required in the operation of an injection mold. Due to the precision of the mold and molding process, clearances are minimal and therefore grease is spread to a thickness or thinness that is more typical of how an oil lubricant would be used. Oil is not an option as there is no containment system for the oil that would allow for the necessary mechanical operation of componentry within the mold.

Additionally, the current methodology and the tangential line of contact deposits normal wear particulates in the mold tooling, these particulates are usually trapped within the lubricant or grease where they could cause catastrophic failure of the mold tooling. However, it is also possible that the particulate could migrate elsewhere within the mold tooling or the molded article Simply put, both oil and grease, when utilized for injection mold tool operation, flow away over time and contaminate the mold, molded parts, and production facility. While FDA approved grease is edible, grease contamination on food packaging, decorated parts or packaging, or medical device molded parts would render those parts as rejects. Rejected parts set into motion an expensive process that is unique to each part or to the processer's procedures as to the disposition of the rejected parts. Fines may be levied by a customer. Lost production or machine down time may result. Remanufacturing or repackaging of parts may be required. Significant resin loss may be incurred. The list goes on and on of potential repercussions from rejected parts, and none of these repercussions is desirable or inexpensive to remedy.

SUMMARY

In one example, according to the teachings of the present disclosure, a mold slide has a slide with a slide body movable along a first direction. The slide body has an angle pin hole formed therein and defines an axis. The angle pin hole has a pocket at one end thereof. An angle pin bushing is seated in the pocket and defines an angle pin bore that is parallel to the axis of the angle pin hole. A mold part is adjacent to the slide part and is movable relative to the slide part along a second direction different from the first direction. An angle pin is carried on the mold part. A portion of the angle pin is positioned in and movable in concert with the mold part relative to the angle pin bore in the angle pin bushing to move the slide part along the first direction.

In one example, the slide part and the mold part can be part of an injection mold tool.

In one example, the second direction can be perpendicular to the first direction.

In one example, the angle pin can be oriented parallel to the axis of the angle pin hole and the axis can be oriented at an angle greater than 0 degrees and less than 90 degrees relative to the first and second directions.

In one example, the angle pin hole can be nearly a circular cross-section shape, with the body of the angle pin bushing having two limited flat regions on opposed sides of the body.

In one example, the angle pin bore of the angle pin bushing can be a generally circular cross-section shape.

In one example, the angle pin hole can be a slot having a non-round oval or oblong cross-section shape.

In one example, the angle pin bore of the angle pin bushing can be a slot having a non-round oval or oblong cross-section shape.

In one example, the pocket can have a larger width than a remainder of the angle pin hole and can define a shoulder at a terminus of the pocket adjacent the remainder of the angle pin hole. The angle pin bushing can be borne against the shoulder within the pocket.

In one example, the angle pin bushing can have a top face that is flush and parallel with a top surface of the slide part surrounding the angle pin hole.

In one example, the angle pin bushing can have a scalloped region on a portion of an exterior surface thereof. The scalloped region can define a step on the exterior surface.

In one example, a clip recess can be formed adjacent the pocket and can have a depth corresponding to the position of a step formed on an exterior surface of the angle pin bushing. A retention clip can be received and retained within the clip recess and can abut against the step to retain the angle pin bushing within the pocket of the angle pin hole.

In one example, the angle pin bushing can be formed from a fabric/resin composite material.

In one example, the angle pin bushing can have an elongate slit formed along a length of the angle pin bushing and through the angle pin bushing from the exterior surface to the angle pin bore.

In one example, the angle pin bushing can have a flat surface region formed on an exterior surface at each of opposed sides of the angle pin bushing.

In one example, the angle pin bushing can have a lead-in relief section at one end thereof. The lead in relief section can include a chamfer at a bottom surface of the slide body.

In one example, the axis of the angle pin hole, the angle pin bore of the angle pin bushing, and the angle pin can each be oriented concentric with one another.

In one example, a retention clip can be received in a clip recess adjacent the pocket and can abut against a step on the angle pin bushing. A fastener hole can be formed through the retention clip and a fastener bore can be formed in the slide body to receive a fastener that retains the angle pin bushing within the pocket. The fastener hole and fastener bore can also each have an axis that is at least parallel with the axis of the angle pin hole.

In one example according to the teachings of the present disclosure, an angle pin bushing for a mold slide includes a body. The body has an exterior surface extending between a top face and a bottom face. An angle pin bore is formed through the body between the top face and the bottom face. The top face and an axis of the angle pin bore are not perpendicular to one another.

In one example, the body can be formed of a fabric/resin composite material.

In one example, a slit can be formed along a length of the body and through the body from the exterior surface to the angle pin bore.

In one example, the top face can be non-parallel with the bottom face and the angle pin bore can be perpendicular to the bottom face.

BRIEF DESCRIPTION OF THE DRAWINGS

The drawings provided herewith illustrate one or more examples or embodiments of the disclosure and therefore should not be considered as limiting the scope of the disclosure. There may be other examples and embodiments that may be equally effective to achieve the objectives and that may fall within the scope of the disclosure. Objects, features, and advantages of the present invention will become apparent upon reading the following description in conjunction with the drawing figures, in which:

FIGS. 9A-9E shows five different views of the angle pin bushing of FIG. 8A, including another perspective view, a top view, a bottom view, a side view, and a front view, respectively.

FIGS. 18A-18C show several views of another alternative example of an angle pin busing according to the teachings of the present disclosure and including a perspective view, top view, and front view, respectively.

FIGS. 19A-19E show several views of another alternative example of an angle pin bushing according to the teachings of the present disclosure and including a perspective view, top view, and front view, respectively, and a top view and a cross-section view, respectively, of a slide incorporating the angle pin bushing.

The use of the same reference numbers or characters throughout the description and drawings indicates similar or identical components, aspects, and features of the disclosure.

DETAILED DESCRIPTION OF THE DISCLOSURE

The disclosed angle pin bushings and mold tool slides solve or improve upon one or more of the aforementioned and/or other problems, deficiencies, and disadvantages with the prior known mold slides and angle pin methodology. The disclosure relates to an angle pin bushing applied to a side action or slide of a mold to improve the functionality of the angle pin. The disclosed angle pin bushings do so by addressing the necessary geometry while increasing the contact surface area with the angle pin exponentially. The disclosed angle pin bushings are in the form of replaceable inserts engineered to saddle the angle pin diameter. The disclosed angle pin bushings can extend the service life of both the angle pin and the slide hole or slot, thereby reducing the preventive maintenance schedule of the slide components and mold tool or components. The disclosed angle pin bushings eliminate the need for using lubricants or grease for the angle pins. These and other objects, features, and advantages of the present disclosure will become apparent to those having ordinary skill on the art upon reading this disclosure.

The saddle geometry of the disclosed angle pin bushings establishes what would be the wear pattern of a slide hole or slot that one would see over an extended life cycle of a mold to the point that additional wear would be negligible. Such minimal wear may be millionths of an inch vs. thousandths of an inch, essentially yielding no measurable difference to the slide stroke over time. The saddle geometry then flares to a functional clearance width typical for smooth operation. Again, the geometry of the disclosed angle pin bushings serves to improve the overall function of the mold tooling.

Figures 8A, 8B:
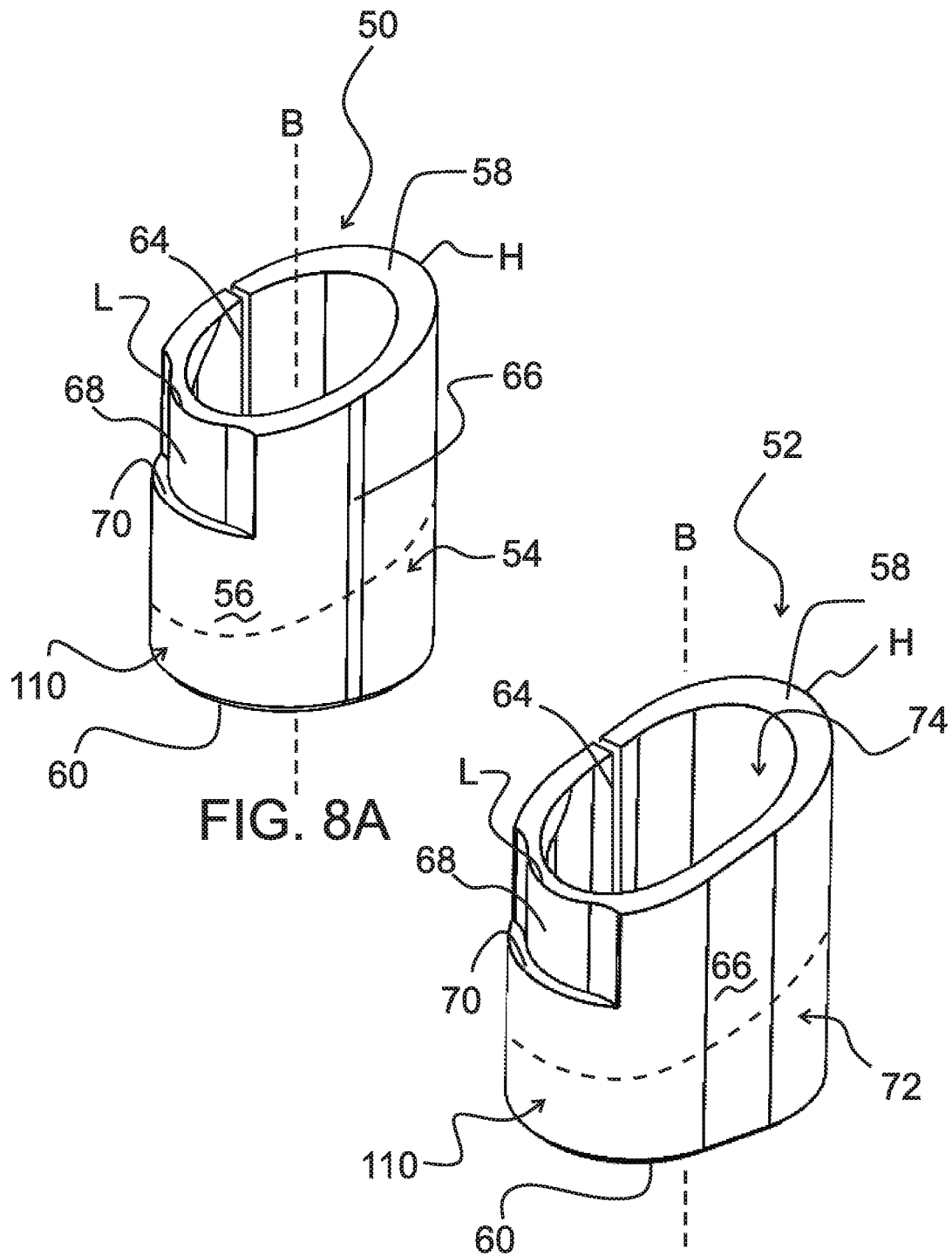
FIGS. 8A and 8B show perspective views of one example of an angle pin bushing for a slide hole and one example of an angle pin bushing for a slide slot, respectively, according to the teachings of the present disclosure.

FIGS. 8A and 8B illustrate two examples of angle pin bushings 50 and 52 constructed according to the teachings of the present disclosure. The angle pin bushing 50 defines a generally round or circular slide hole shape for a mold slide. The angle pin bushing 52 defines an oblong or oval slide slot shape for a mold slide. FIGS. 9A-9E illustrate various view of the angle pin bushing 50, which is described in detail. Other than the oblong or oval shape of the body and slot, the description is equally applicable to the angle pin bushing 52.

With reference to FIGS. 9A-9E, the angle pin bushing 50 has a generally cylinder-shaped body 54 with an outer or exterior surface 56, a top end or face 58, and a bottom end or face 60. A bore 62 extends completely through the body 54 in a lengthwise direction and thus opens to both the top face 58 and bottom face 60. The bore in this example is generally round or circular, though it may not be precisely circular, as discussed below with regard the saddle geometry shape. The bottom face 60 is generally flat or planar and is oriented orthogonal or perpendicular to an axis B of the bore 62. The top face 58 is oriented at an angle relative to the axis B such that the top face is not parallel to the bottom face 60 and is not perpendicular to the bore axis. A thin or narrow slit 64 is formed lengthwise along and through the body 54 from the outer surface 56 to the bore 62. The slit 64 forms a break in the circumference of the body 54.

A low point L of the top face 58, relative to its distance from the bottom face 60, references a front of the angle pin bushing 50 (see FIG. 9D) and a high point H of the top face, relative to its distance from the bottom face, references a back of the angle pin bushing. With these references in mind, opposed sides of the body 54 may include relatively narrow, flat, timing surfaces 66 extending lengthwise along the angle pin bushing 50 between the top and bottom faces 58, 60. These flat surfaces 66 can give the body 54 a generally circular shape, but slightly oval shape on the exterior surface 56. Also, in this example, the body 54 has a scalloped or reduced thickness region 68 formed in the outer surface 56 on the front of the body 54 from the top face 58 and terminating partway along the length of the body. The terminus or end of the scalloped region 68 defines a step 70 on the front of the angle pin bushing 50.

The angle pin bushing 52 has substantially the same structure in this example. However, the angle pin bushing 52 has a body 72 that is substantially oval or oblong in configuration instead of being substantially round. Further, the angle pin bushing 52 has a bore 74 with an oval or oblong shape as well to create the above-described lost motion delay, if desired. The other features of the angle pin bushing 52 are essentially the same as the angle pin bushing 50 and thus are depicted using the same reference numbers in the drawings.

As shown in FIG. 10, and again with relation to the angle pin bushing 50, a mold and slide arrangement, i.e., a mold slide, is simplistically depicted. The mold again has a first half (not shown) and a second half 42, i.e., a mold part, that carries the angle pin 28. The mold halves are movable relative to one another in the direction of the arrows MC/MO, as described earlier. The mold also has a slide part, i.e., a slide 80 having a body 82 and a coring element 84. The slide 80 further has a hole 86 with a generally round or circular cross section shape. The hole 86 is formed at an angle through the body 82 or in other words is not perpendicular to the top and bottom surfaces 88, 90 of the body nor to the movement or slide direction S.

The disclosed angle pin bushing 50 is received within the hole 86. In the disclosed example, the angle pin bushing 50 is received within a pocket 92, i.e., a larger diameter section of the hole 86 at one end of the hole in the slide part. The bottom face 60 of the angle pin bushing 50 is borne against a shoulder 94 or ledge at the depth or terminus of the pocket, i.e., where the larger diameter pocket 92 terminates within the hole 86. The shoulder 94 stops further insertion of the angle pin bushing 50 into the hole and thus properly positions the angle pin bushing at the desired depth within the hole in the slide 80. The angled top face 58 is oriented at the same angle relative to the axis B of the bore 62 as the angle of the hole 86 relative to the orientation of the slide 80 and slide direction S. By controlling the angle of the top face 58, the length of the angle pin bushing 50, and the depth of the shoulder 94 within the hole 86, the top face 58 lies flush with the top surface 88 on the body 82 of the slide 80.

As used herein, the phrase "saddle geometry generally refers to the contact area between the angle pin and the bushing surfaces. Specifically, the radius at the contact sides of the angle pin bushing bore is essentially the same as the angle pin catalog size. Actual angle pins are about 0.001 inch undersized of the catalog size. Thus, the bushing will have a 0.0005 clearance on the functional radii, i.e. the saddle or pin to bushing contact area. Additionally, this radius is carried about 90 degrees (45 degrees in each direction from the mid-plane of the bushing at each contact side. Thus, there is a 90 degree sweep of radius that is within 0.0005 inches of the angle pin diameter. This built or designed in saddle geometry then basically approximates many cycles of wear having occurred in the prior art loose fit arrangement, i.e., comparative to a tangential line of contact worn down over time to more surface area contact between pin and bore and slide material. That wear in the existing slide and angle pin construction would have otherwise deposited particulate into the grease as it wears into the bushing. With the increased surface area provided by the disclosed angle pin bushings, the disclosed bushings will all but eliminate wear particulate. This saddle geometry also ensures that the disclosed composite material bushings will have significant bearing surface against the angle pin. In current designs, the above-described significantly oversized hole or oval slot are used, creating the wear problems.

Figure 10:
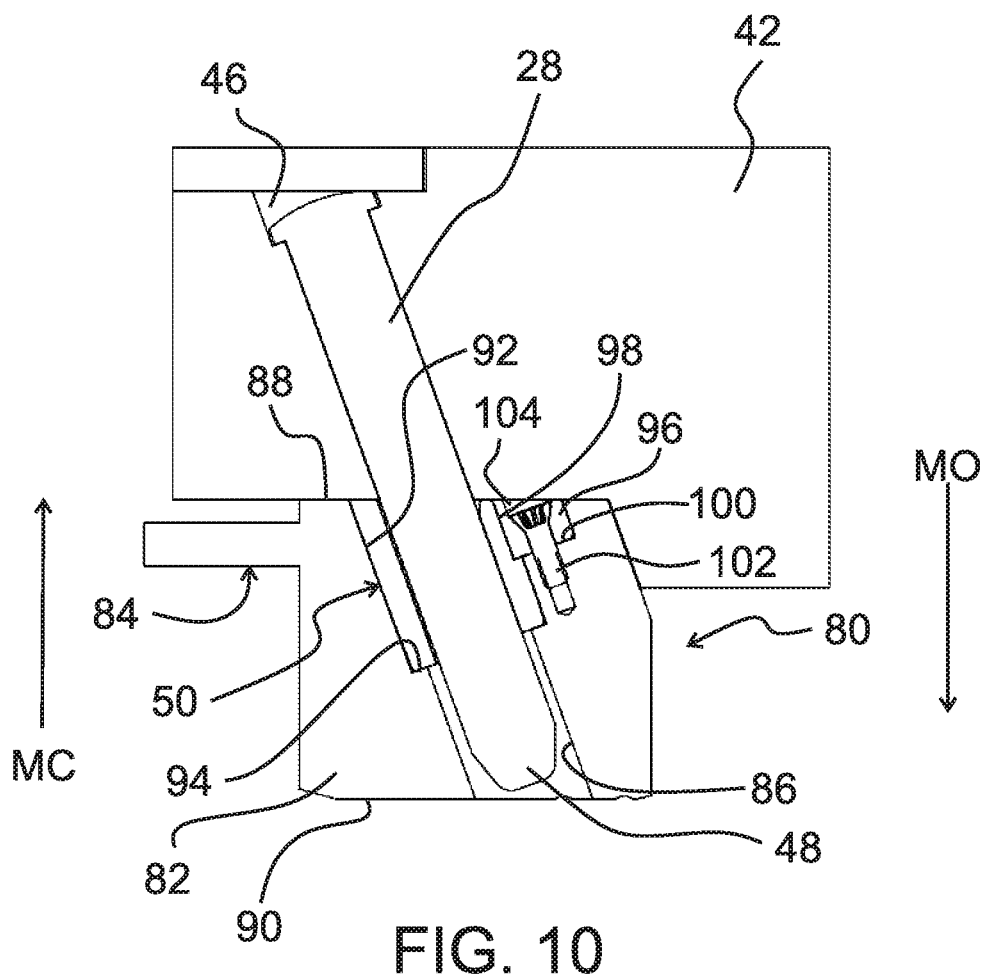
FIG. 10 shows a cross-section view of a mold like that of FIG. 2 but also including one example of an angle pin bushing like that of FIGS. 8A and 9A-9E installed in a mold slide and engaging an angle pin.
Figure 11:
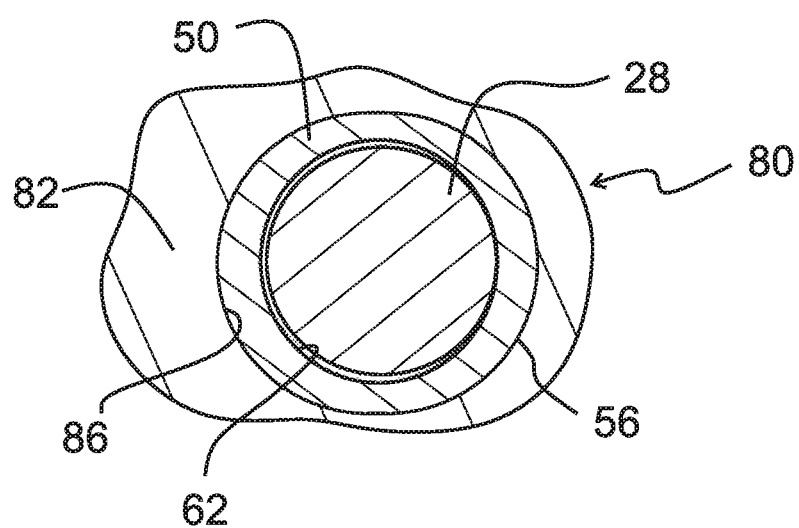
FIG. 11 shows a cross-section view of the saddle geometry of the slide, slide hole, angle pin, and angle pin bushing of FIG. 10 according to the teachings of the present disclosure.
Figure 12:
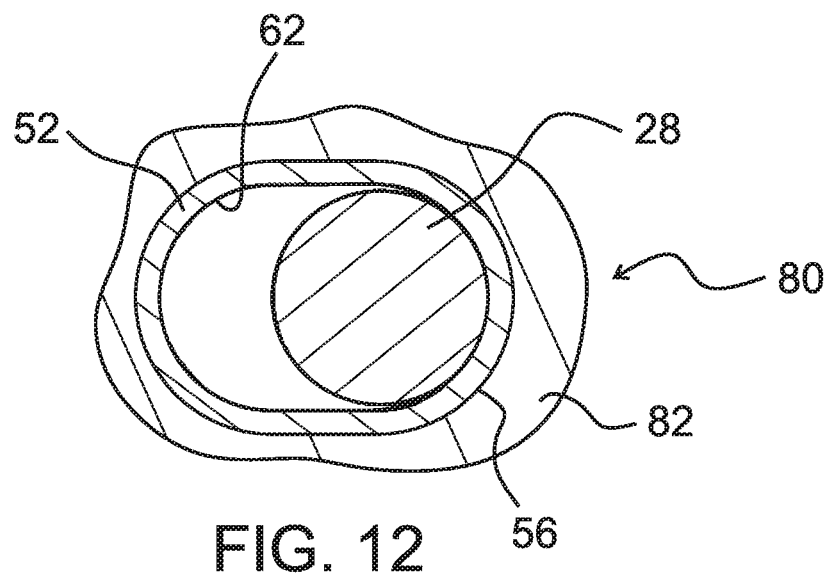
FIG. 12 shows a cross-section view like that of FIG. 11 but of the saddle geometry of a slide, slide slot, angle pin, and angle pin bushing according to the teachings of the present disclosure.

As shown in FIG. 11, the need for a loose fit or running fit required for existing slides and angle pins is reduced or eliminated. The angle pin 28 diameter and saddle geometry or shape of the bore 62 can be very closely matched to the pin diameter through the angle pin bushing 50. Likewise, as shown in FIG. 12, the angle pin bushing 52 can have a bore slot width and saddle geometry or shape at each end of the bore 74 can also be very closely matched to the pin diameter. Further, the diameter of the hole 86 (or slot) in the slide 80 below the pocket, as shown in FIG. 10, can be larger than the diameter of the angle pin 28. This provides clearance at the tip or distal end of the angle pin 28 for reasons discussed further below.

Figure 13:
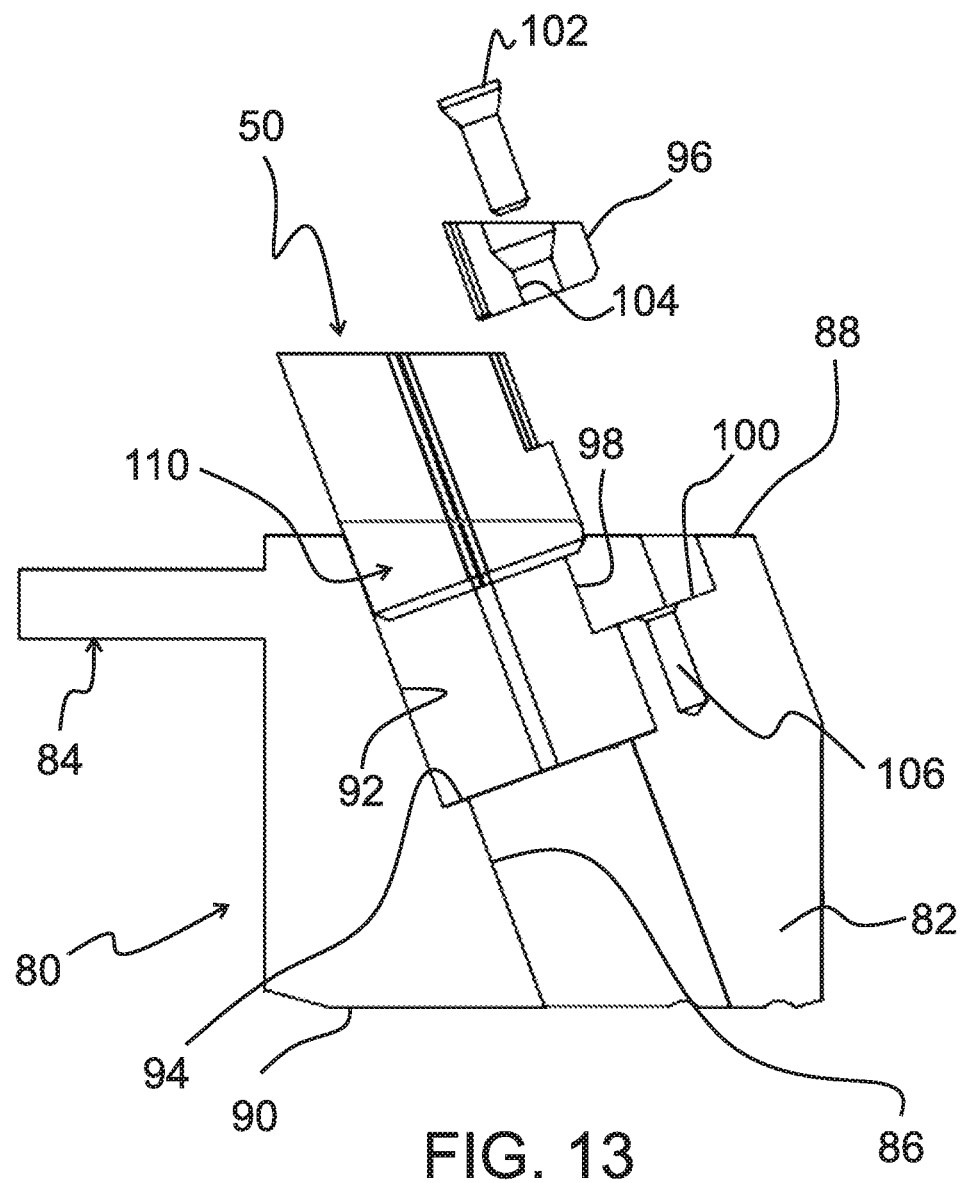
FIG. 13 shows a partial exploded view of the slide and angle pin bushing arrangement of FIG. 10.

As shown in FIGS. 10 and 13, the angle pin bushing 50 can be retained in the body 82 of the slide 80 by a retention clip 96. A clip recess 98 is formed in the body 82 in the top surface 88 to a depth less than that of the pocket 92. The clip recess 98 extends laterally further outward from the pocket 92 into the body 82 and terminates at a ledge 100. The depth of the ledge is the same as the depth position of the step 70 on the angle pin bushing 50 and the scalloped or reduced thickness region 68 on the body 54 coincides with the clip recess 98. The retention clip 96 is sized and shaped to fit within a void in the body 82 of the slide 80 created by the clip recess 98 in the body and the scalloped region 68 on the angle pin bushing 50. The retention clip 96 is borne against both the step 70 on the angle pin bushing 50 and the ledge 100 within the pocket 92. A fastener, such as a screw 102, can be inserted through a hole 104 in the retention clip 96 and engage a threaded bore 106 in the clip recess 98 to secure the retention clip 96 in place.

Figure 14A:
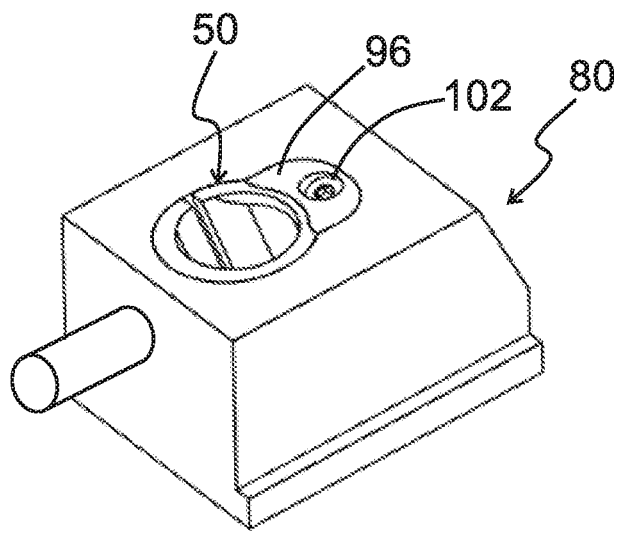
FIGS. 14A and 14B show perspective views of an assembled slide of the type shown in FIGS. 10, 11, and 13, and an assembled slide of the type shown in FIG. 12 according to the teachings of the present disclosure.
Figure 14B:
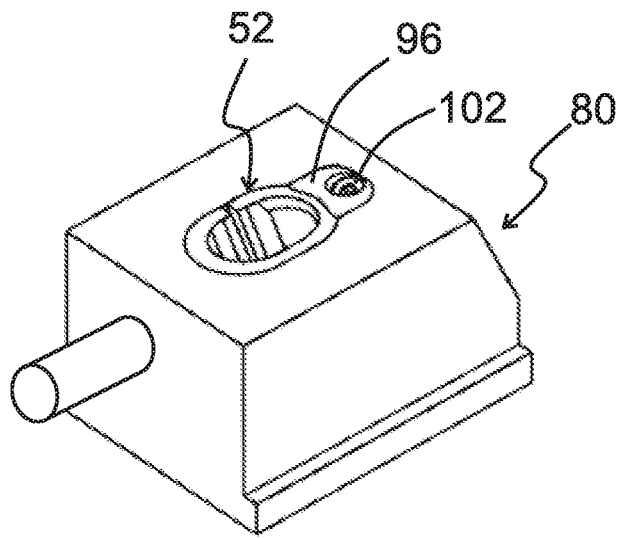

Also, the angle pin bushing 52 with the slot shaped bore 74 can be secured in the same manner but in a slide modified to accommodate the oval or oblong shape of the body 72. The sizes and shapes of the clip recess 98 in the slide body 82, the scalloped region 68 on the front of the angle pin bushing 50 or 52, and the retention clip 96 can vary considerably and yet function as intended. However, these components and aspects of the mold tool should be cooperatively shaped to accommodate one another. FIGS. 14A and 14B show the angle pin bushings 50 and 52 installed in corresponding slides. Both the retention clips 96 and the angle pin bushings 50, 52 can be flush with the top surfaces 88 of the slides when the slide is assembled.

The disclosed angle pin bushings 50 and 52 as shown and described herein provide improvements over conventional angle pin methods. Additionally, the installation and retention of the disclosed angle pin bushings 50 and 52 are also novel. As noted below, the angle pin bushings 50 and 52 can be made from different materials and thus the angle pin contact surfaces within the slide bodies are not limited to the material of the slide body, as in the prior art. The material of choice for the angle pin bushing 50 and 52 can be selected for maximizing the wear properties, cost, durability, friction characteristics, replacement schedule, and the like in view of a given mold application. The disclosed angle pin bushings 50 and 52 are installed into a matching angled pocket within the hole or slot of the slide component or part. The sizes and shapes of the pockets in the slides and the bushing bodies 54 and 72 can vary considerably from the disclosed examples, depending on the needs of a given mold application.

The pocket shoulder 94 in the slide body 54 or 72 limits the installation depth of the angle bushings 50 and 52 into the hole 86 or slot of the slide to a predetermined level. The angle pin bushings 50 and 52 in the disclosed examples have the two flat timing surfaces 66 on the opposite sides of the body 54 or 72. These surfaces or flats 66 orient the angle pin bushing 50 or 52 about its longitudinal axis so that the bushing geometry will align with the hole 86 or slot in the corresponding slide body. Thus, the angle pin bushings 50 and 52 can be precisely aligned with the mold angle pin 28. The flat surfaces 66 and the installation depth of the angle pin bushings 50 and 52 can be configured so that the bushing top face 58 is flush with the top surface 88 of a slide 80 or the like when installed. The flat surfaces 66 may be wider on the angle pin bushing 52 because of the oval or oblong shape of the body 72.

Regarding material selection, the angle pin bushings 50 and 52 as described herein may be fabricated of a highly wear resistant metal, such as bronze, aluminum bronze, or other suitable metal bearing materials. Such bushings could include a coating and/or lubricant at least on the inner surface of the respective bores 62 or 74 to minimize frictional heat build-up and allow for smooth operation. A product manufactured from these materials would be readily adopted by the industry due to the familiarity the industry has with these types of common materials. However, the disclosed angle pin bushing geometry now broadens the consideration and scope of materials that may be used to fabricate the angle pin bushings 50 and 52. A desirable material selection for the angle pin bushings 50 and 52 would not require any lubrication, would be naturally wear resistant to enhance the unique and novel geometry, and would perform in all current molding environments. In one example, such an alternative material would be a wear resistant fabric/resin composite with a resin system capable of performing within the wide-ranging environments as seen in production manufacturing.

The disclosed angle pin bushings 50 and 52 are essentially bushings, and some standard bushings are used for other purposes in injection molds. Thus, one should understand that in the mold tool building community, standard bushings are typically designed with an intentional interference press fit into their respective openings. Thus, standard bushings typically require the assistance of a press, typically fitted with a hydraulic cylinder that can produce several tons of pressure, to be fit or inserted. This is necessary, as the standard bushings are intentionally oversized on their outside diameter creating the interference fit with the mating hole geometry in the mold tool. This process is relatively simple in nature, as the bushing and receiving bore are axially vertical relative to the mold tool surfaces and the initial contact between bushing and orifice is parallel to each other.

In contrast, in the case of the disclosed angle pin bushings 50 and 52, the installation is not parallel to the surface of installation, as depicted in FIG. 13. The need to use a hydraulic press would be impractical, cumbersome, and time consuming to accommodate the angle of installation. This angle α is typically less than 90 degrees, and in many examples is between about 10 degrees and about 20 degrees, depending on the rate of slide desired per rate of mold separation for a given mold tool application. The disclosed angle pin bushings 50 and 52 may optionally have two geometry features that aid during installation with a slight press fit and no need to implement a hydraulic press to seat the bushing. The first such optional feature is a lead-in relief section 110 at the base of the angle pin bushing body 54 or 72, i.e., adjacent the bottom face 60. In this example, the relief section 110 is tilted and thus not perpendicular to the bottom face 60 of the angle pin bushing 50 or 52. In one example, the taper angle of the relief section 110 can be the same as the angle α of the hole 86 or slot in the slide body. The relief section 110 can also be slightly chamfered such that the relief section is engineered to readily fit in the hole 86 or slot and to maintain a line of surface intersection between the relief section and the axial outer profile of the bushing that is parallel with the receiving angle of the installation pocket 92.

The second such optional feature is the narrow slit 64 provided along the length of the angle pin bushings 50 and 52 and located specifically within one of the two flat timing surfaces 66. The slit 64 is engineered to allow the angle pin bushing 50 or 52 to have a minimal amount of deflection during installation. The placement of the slit 64 is intentionally located away from the working surfaces, i.e., the inner front and rear pin contact surfaces, of the angle pin bushings 50 and 52. The positioning is such that the bushings can perform as intended while allowing installation without the need for excess force that could damage the bushing during this process.

Figure 15A:
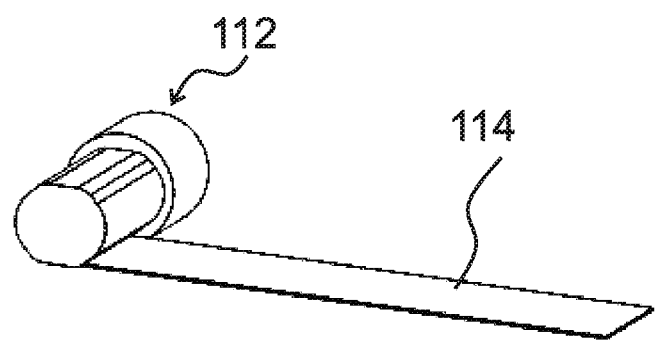
FIGS. 15A and 15B shows a mandrel form and method to fabricate a composite angle pin bushing according to the teachings of the present disclosure.
Figure 15B:
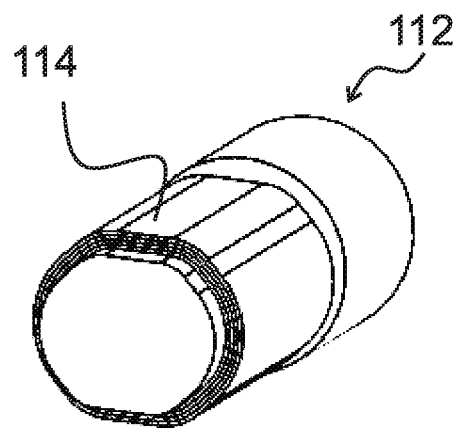

Regarding the aforementioned fabric/resin composite material, there is almost no limit to the geometries that can be shaped with composites through various manufacturing methods. A very common geometry is that of a cylinder. The angle pin bushing with conventional geometry could be manufactured as a cylinder. However, that would still yield a tangential line of contact between the angle pin bushing and the angle pin. If the novel geometry were to be machined into the cylinder, that too would yield a product with performance deficiencies as the fibers of the fabric/resin composite substrate would not be oriented in a manner that maximizes the fabric/resin composite wear resistance capabilities evidenced by a continuous uninterrupted surface of wear resistant composite. Thus, in one example, the novel geometry of the angle pin bushing 50 or 52 may be created with unique mandrels, such as a mandrel 112 as depicted in FIG. 15A. The mandrel 112 can be precisely shaped to form the internal bushing geometry. The fabric/resin composite material 114 can be wrapped around the mandrel to yield a bushing body 54 having the desired thickness. The composite material substrate 114 can be oriented in a way that mates the functional surface in direct contact with the appropriate size angle pin thereby maximizing the wear resistance properties of the composite. Outer surface features, such as the slit 66 and the scalloped region 68 and step 70 can be machined in the bushing body after the composite material 114 is formed to the mandrel 112.

While the disclosed angle pin bushings 50 and 52 have largely been described as beneficial to the mold processing community (molders of plastic parts), the mold tool building community (machinists who build the tooling) would also benefit from the availability and implementation of the angle pin bushings constructed of either a wear resistant metal alloy or fabric/resin composite. As earlier described, there can be significant force required to move a slide. That force may necessitate the fabrication of the slide parts themselves from what is normally referenced as a tool steel alloy. The angle pin bushing acting as the bearing surface for the force to move the slide allows alternate materials, such as certain stainless steels, aluminum, and others, to be considered for use as a mold tool slide.

Tool steel alloys are more expensive per pound, generally require more time to initially machine, and necessitate heat treatment to maximize the alloy properties. While the heat treatment process adds expense and time, the greater expense comes from the secondary machining operations required to form the parts. Further, heat treatment alters the molecular structure of the alloy. This alteration in molecular structure is known to the mold tool building community and is factored in during the initial machining process prior to having the heat treatment service performed. To summarize, tool steel alloys are machined the first time leaving excess steel that allows for warp and dimensional change that occurs during the heat treatment process. Then, once the heat treatment process is finished, the mold tool builder now needs to machine the hardened tool steel component a second time to correct the warp and properly finish the part to the desired precise specifications. Thus, the disclosed angle pin bushings 50 and 52 broaden the scope of materials to be considered for use as slide body components, not only in the conventional sense with current materials and manufacturing practices, but further to include evolving materials and processes. The mold slides can include 3D printed components and new material combinations that may be developed to enhance molding but may not be well suited for a load bearing surface to interface with an angle pin during mold operation. Again, the heat treatment process adds expense and delay as this is typically a specialty service.

During operation, the mold angle pin 28 will engage the disclosed angle pin bushings 50 or 52 in such a way that the pin will try to extract the bushing from the receiving pocket 92 during mold half separation and then reversibly drive the bushing deeper into the pocket as the mold halves close. The shoulder 94 on the pocket bottom prevents the angle pin bushing 50 or 52 from being forcibly pushed through the slide component as the mold halves close. The engineered retention clip 96 holds the angle pin bushing 50 or 52 in place while providing solid support at the top of the bushing as the angle pin exits the bushing. While the retention clip 96 could have varying geometries to accomplish this task, the disclosed clip geometry, as in FIGS. 10 and 13, provides support behind the force receiving surface area of the angle pin bushing 50 or 52. The disclosed angle pin bushing pocket 92 and retention clip recess 98 are disposed at matching angles to the hole 86 or slot in the slide component, such as the slide 80, so that the pocket and recess depths are easily achieved and so that the pocket surfaces are parallel to the angle of the hole or slot, allowing a single set up regardless of the machine tool being used.

Figure 1:
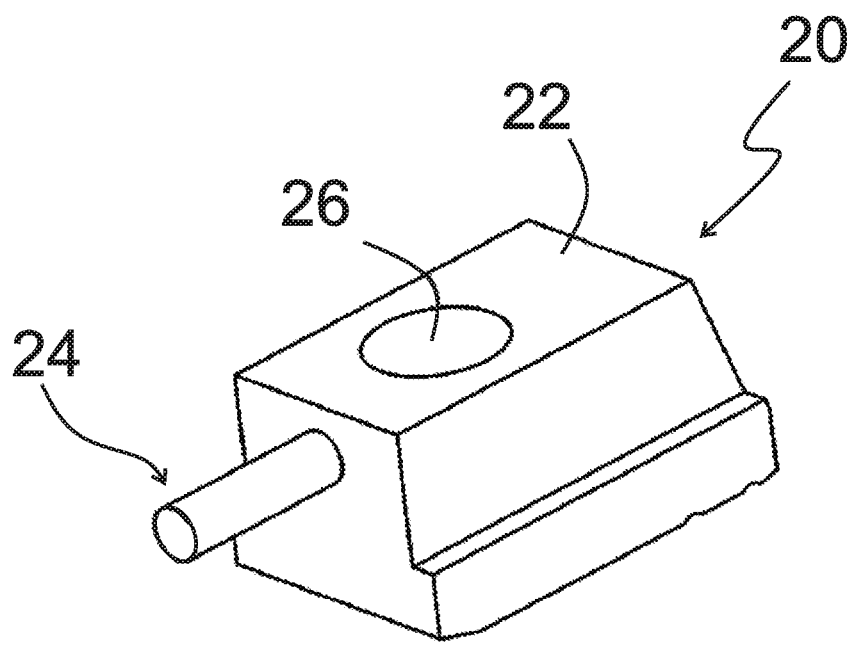
FIG. 1 shows a perspective view of one example of a prior art slide with an angle pin hole formed therein.
Figure 2:
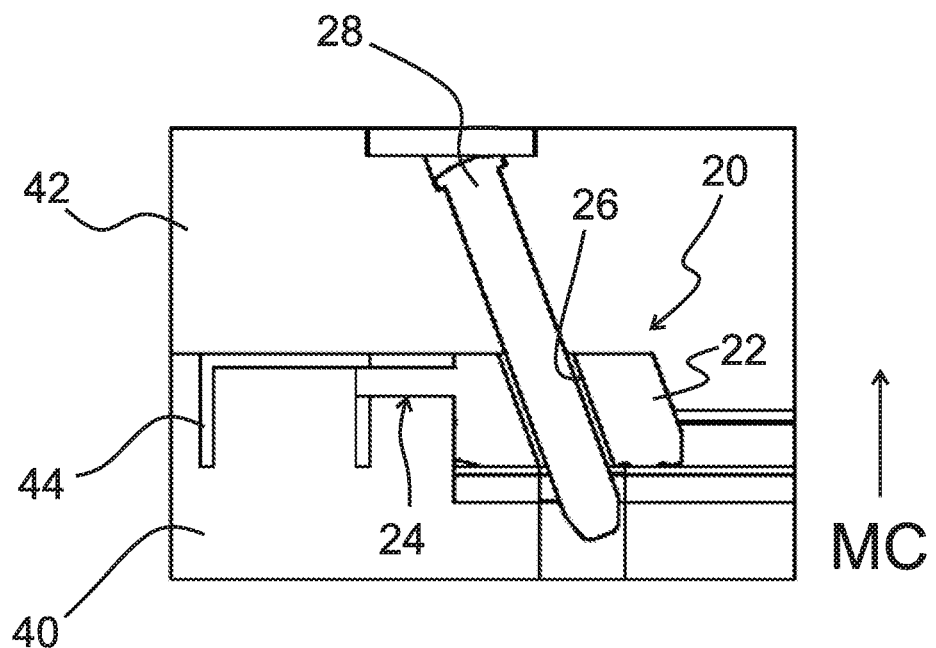
FIG. 2 shows a cross-section view of one example of a mold having an angle pin and slide as shown in FIG. 1 and with the mold in a closed position.
Figure 3:
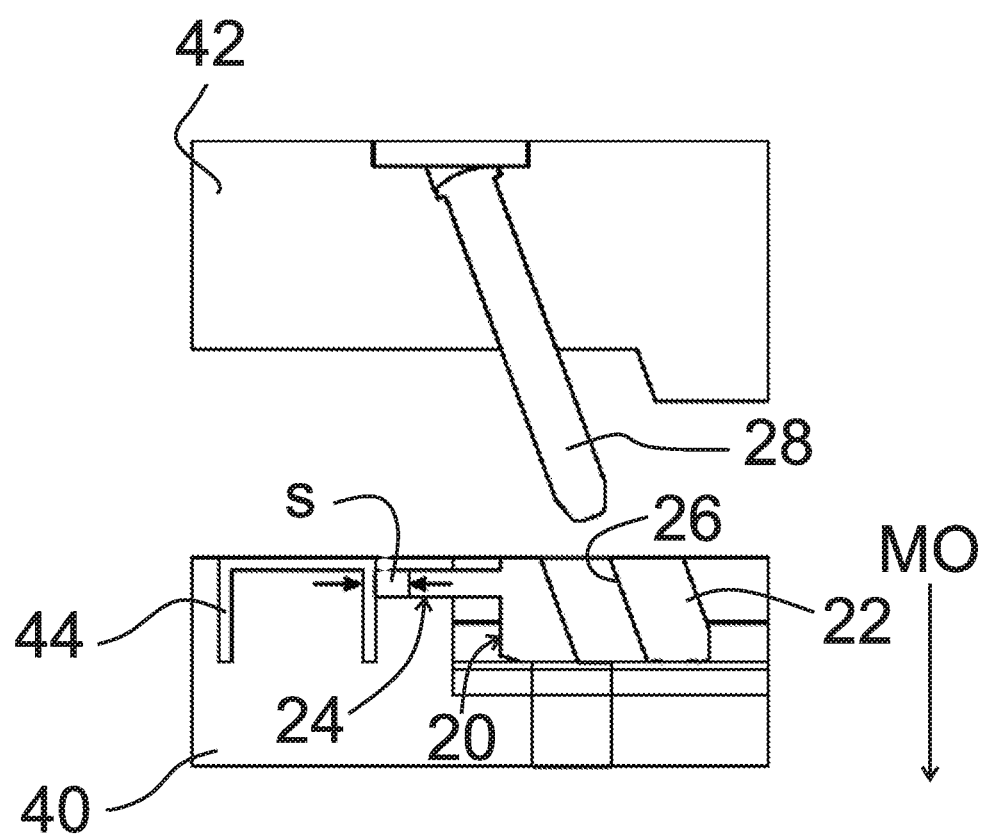
FIG. 3 shows a cross-section view of the mold and angle pin of FIG. 2 but with the mold in an open position.
Figure 4:
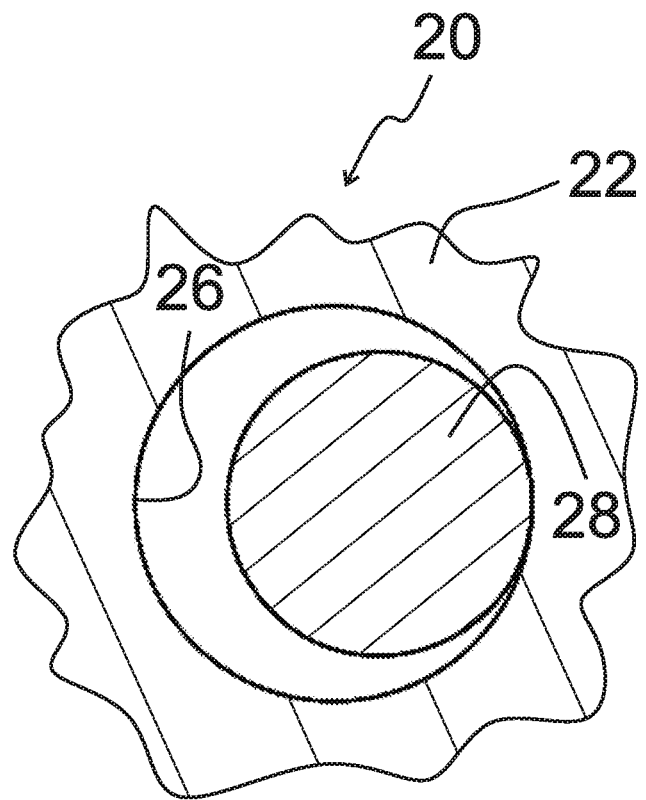
FIG. 4 shows a cross-section view of a prior art angle pin and hole for a slide, such as that depicted in FIG. 1.
Figure 5:
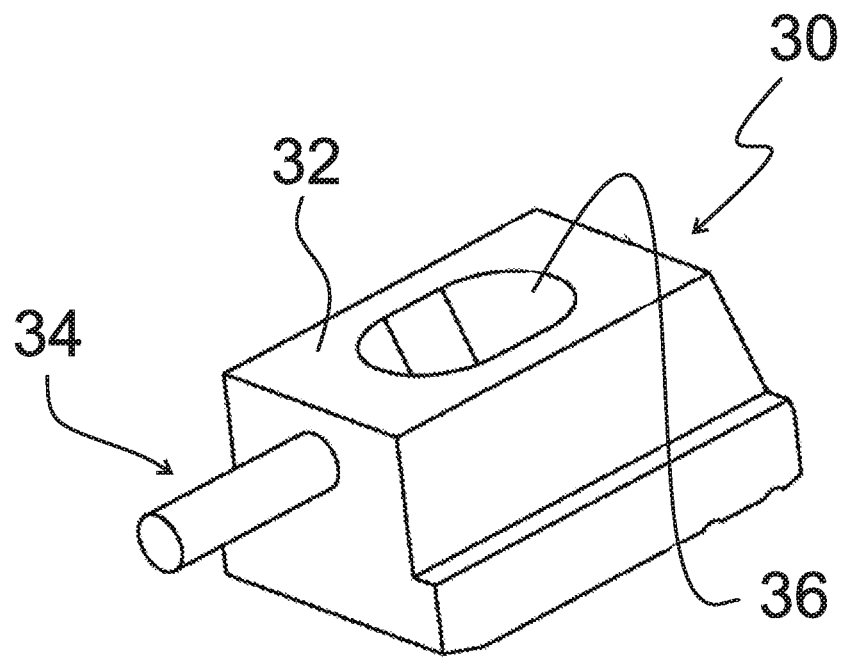
FIG. 5 shows a perspective view of another example of a prior art slide with an angle pin slot formed therein.
Figure 6:
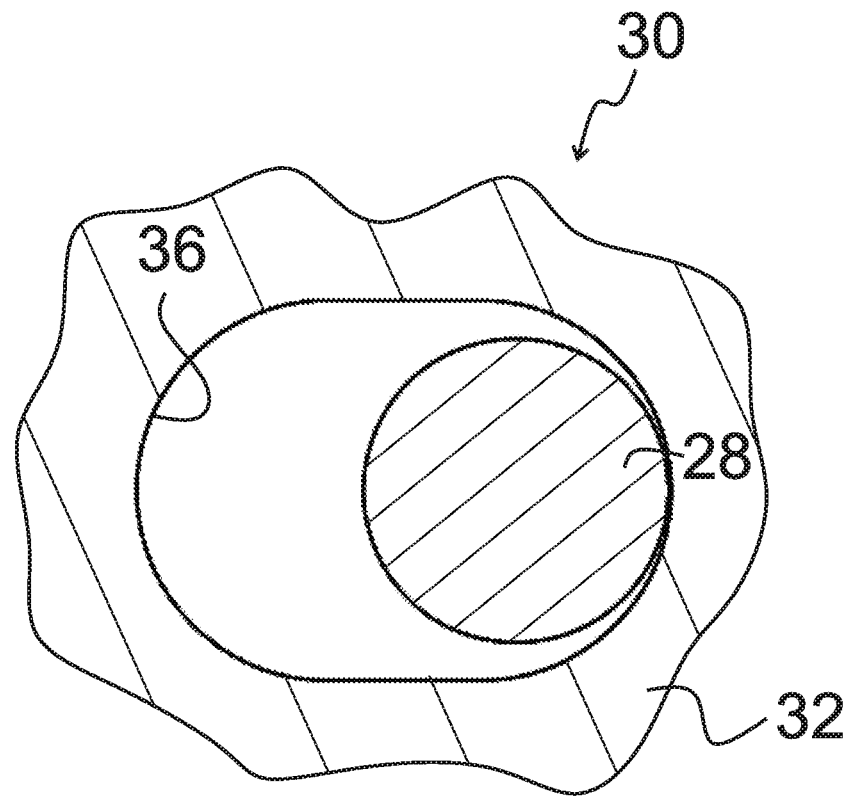
FIG. 6 shows a cross-section view of a prior art angle pin and slot for a slide, such as that depicted in FIG. 5.
Figure 7:
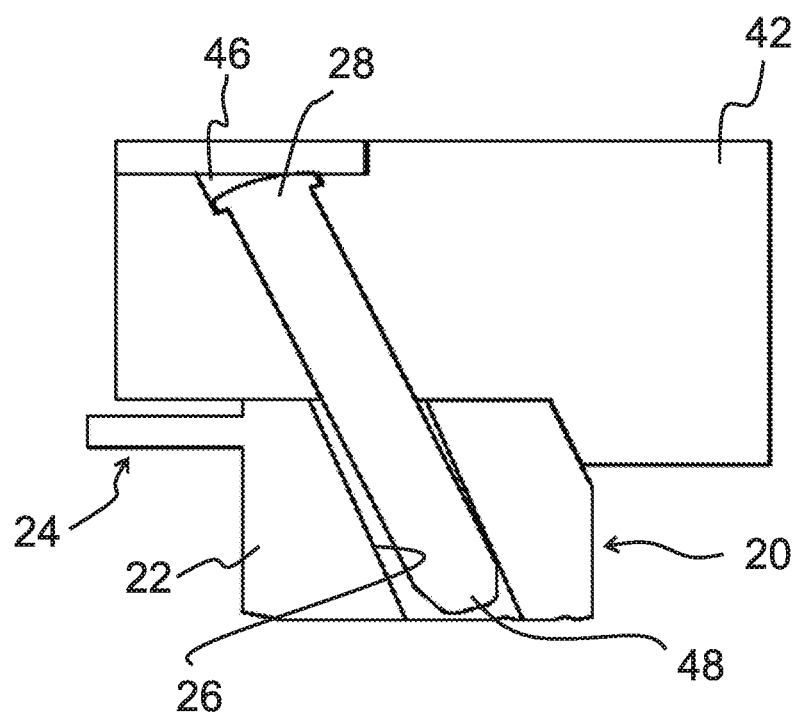
FIG. 7 shows a cross-section view of the mold and angle pin of FIG. 3 but where the angle pin and the hole are misaligned, i.e., are not oriented at precisely the same angle.

The angle pin bushing location and installation method within the slide parts yields benefits for both the molder and mold builder. For the molder, the location of the angle pin bushing 50 or 52 ensures that, as the angle pin 28 engages the bushing, the necessary force to function the slide motion is nearer to the proximal end of the angle pin, i.e., closer to the mounting opening 46 where the angle pin is supported in the second mold half 42. A portion of the working end 48 of the angle pin extends through the angle pin bushing 50 or 52 and into the available clearance space or portion of the hole 86 below or beyond the angle pin bushing and the pocket 92. Occasionally, the orientation of the angle pin hole 86 or the angle pin mounting opening 46 are formed or installed where the angle may vary by seconds or minutes, i.e., a fraction of a degree from the engineered specification. Without the angle pin bushing 50 or 52, the tip of the angle pin 28 at the working end 48 may engage the slide at its tip where it is levered and then deflected, as represented by FIG. 7. This may potentially create catastrophic failure of the pin and damage the mold tool.

With respect to the mold builder, in the instance of a large slide, the typical angle pin hole can be quite deep. Angle pin holes are required to be smooth along the entire depth of the hole. Creating a smooth and straight hole through a deep slide is limited to special equipment such as a Gun Drill. Gun Drilling is most often performed by a unique service provider who specializes in the Gun Drilling process. This now requires that the slide be shipped to the service provider, adding significant expense and delay for the mold builder. The disclosed angle pin bushings 50 and 52 allow for conventional drilling of clearance through a deep slide without concern for the surface finish of the hole through the entirety of the slide angle pin hole geometry. The angle pin bushing 50 or 52 provide smooth functional surfaces and the necessary machining of the hole 86 and the receiving pocket 92 in the slide is easily accomplished with conventional machine tool equipment.

Further, as best depicted in FIG. 13, the angle pin hole 86 (or slot) in the slide 80, the angle pin bushing 50 (or 52), and the angle pin bore 62 (or 74) are each formed having axes that are at least oriented parallel with one another, if not concentric with one another. The retention clip 96 abuts against the step 70 on the angle pin bushing 50 (or 52) and is thus received in a portion of the pocket 92, as well as the clip recess 98. The retention clip screw hole 104, the threaded bore 106 in the slide 80, and the screw 102 retain the angle pin bushing 50 (or 52) within the hole 86 (or slot) and are installed in a direction parallel with the angle pin hole. The retention clip 96, screw hole 104, threaded bore 106, and screw 102 also each have axes that are at least parallel with each other and parallel with the axes of the angle pin hole 86 (or slot), angle pin bushing 50 (or 52), and angle pin bore 62 (or 74). In this arrangement, all of these various axes are parallel with the axis of the angle pin hole 86 (or slot). Thus, when forming the slide pocket 92 in the body of the slide 80 for the angle pin bushing 50 (or 52) within the angle pin hole 86 (or slot), which is done using a milling machine, all the various surfaces and holes can be formed without having to reposition the slide 80 to another angle to form the bushing pocket 92 and retainer clip recess 98. More specifically, the angle pin hole 86 can be drilled, the bushing pocket 92 can be formed, the clip recess 98 for the retention clip 96 can be formed, and the screw hole 104 and threaded bore 106 for the retention clip 96 clip can be drilled, all along the same axis angle, without having to reorient the slide 80. This geometry thus simplifies the fabrication process while still offering the many benefits of utilizing the disclosed angle pin bushings.

The angle pin 28 is oriented at a desired angle to create a desired amount of movement of the slide 80 in one direction as the second mold part 42 is moved in a different direction. In one example, the slide 80 may move in a horizontal direction, back and forth, depending on whether the mold is opened or closed. The mold part 42 may move in a vertical direction, up and down, perpendicular to the slide movement direction. Other varied relative movement directions are possible as well.

Figure 16:
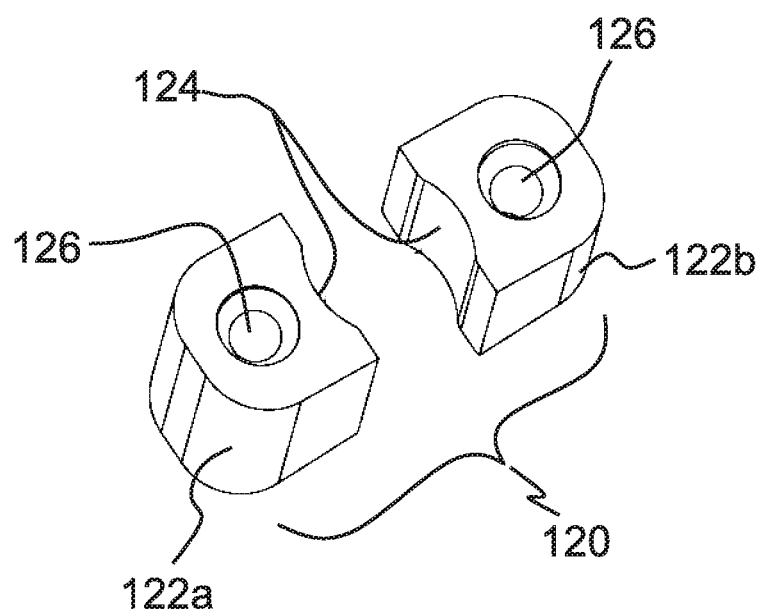
FIG. 16 shows one alternative example of an angle pin bushing according to the teachings of the present disclosure.

As noted above, the configuration and construction of the disclosed angle pin bushings can vary considerably and yet function as intended. Only a very few of the many possible examples are described below. Referring to FIG. 16, one alternative example of an angle pin bushing 120 is shown. In this example, the angle pin bushing 120 is split into two separate bushing parts 122a and 122b. Each part 122a and 122b has a bearing face 124, which face one another, and which define the saddle geometry of the bushing 120. Each bushing part 122a and 122b has a separate fastener hole 126 for securing the angle pin bushing 120 in an angled pocket of a slide. The parts 122a and 122b may be tapered in height across the angle pin bushing 120 so that an angled pocket, similar to the prior examples, can be used in the slide, leaving the top faces flush with the slide and the bearing surfaces oriented at the angle of the angle pin.

Figure 17B:
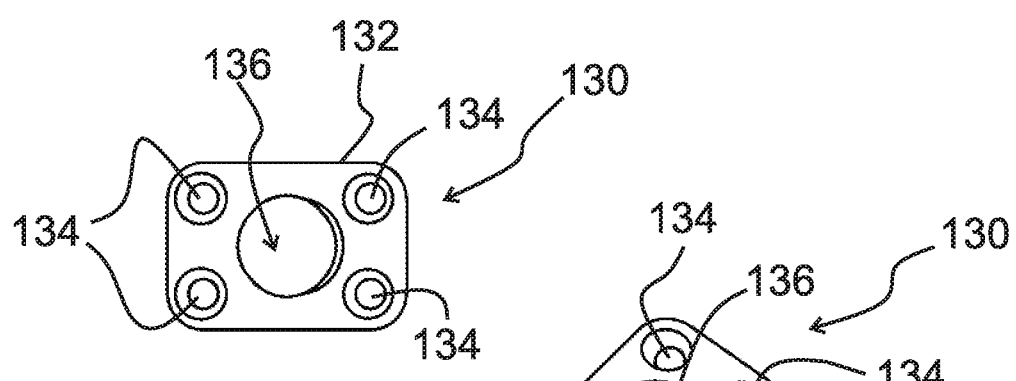
FIGS. 17A-17C show several views of another alternative example of an angle pin busing according to the teachings of the present disclosure and including a perspective view, top view, and front view, respectively.
Figure 17A:
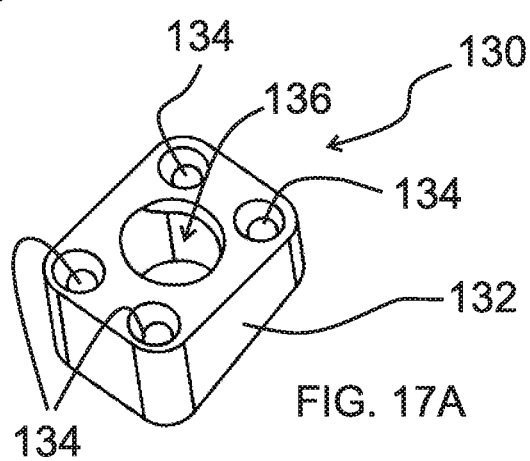
Figure 17C:
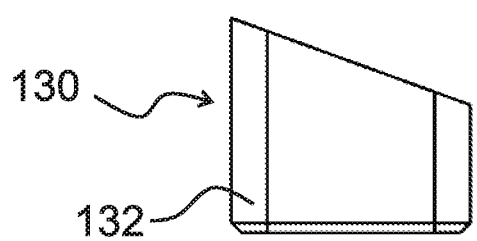

FIGS. 17A-17C show another alternative example of an angle pin bushing 130. In this example, the angle pin bushing 130 has a rectangular body 132 that includes four fastener holes 134 surrounding an angle pin bore 136 for securing the angle pin bushing in a rectangular pocket of a slide. The angle pin busing 130 may otherwise be similar to the prior described angle pin bushing 50, 52 examples.

FIGS. 18A-18C show another alternative example of an angle pin bushing 140. In this example, the angle pin bushing 140 again has a rectangular body 142, but instead includes only two fastener holes 144 adjacent a front side of an angle pin bore 146 for securing the angle pin bushing in a rectangular pocket of a slide. The angle pin bushing 140 may otherwise be similar to the prior described angle pin bushing 50, 52, 130, examples.

FIGS. 19A-19C show another alternative example of an angle pin bushing 150. In this example, the angle pin bushing 150 again has a rectangular body 152 with two fastener holes 154 adjacent a front side of an angle pin bore 156 for securing the angle pin bushing in a rectangular pocket of a slide. However, in this example, a top face 158 and a bottom face 160 of the body 152 are parallel to one another. Instead, the angle pin bore 156 is oriented at the angle of the angle pin relative to the orientation of the top face 158. In this example, and referring to FIGS. 19D and 19E, a slide 162 is formed having a pocket 164 that is orthogonal or perpendicular to the orientation of the top and bottom faces 158, 160 of the body 152. An angle pin hole 166 is formed from the bottom, i.e., a step 168 of the pocket 164 and through the remainder of the slide 162. The angle pin hole 166 is oriented at the same angle as, and is thus parallel with, the angle pin bore 156. The diameter of the angle pin hole 166 is slightly larger than the diameter of the angle pin bore 156 to create the clearance space below the angle pin bushing 150 for the working end of an angle pin during use, as noted above.

The foregoing alternative examples are constructed according to the teachings of the present disclosure and illustrate that the angle pin bushing size, shape, features, and characteristics can vary from the limited examples shown and described herein. In another example, each of the alternative angle pin bushings 120, 130, 140, and 150 eliminates the retention clip, retention screw, and clip recess in favor of using fasteners to directly retain the bodies of the angle pin bushings in the slide pockets.

The mold tool and parts, which incorporate a mold slide with angle pins and the disclosed angle pin bushings can also vary considerably. An injection mold tool is typically separated into two respective mold halves, as described above. These mold halves are commonly known as the "A" side and the "B" side of the mold tool. The mold tool often includes one or more slides located in either the "A" side or the "B" side of the mold. Typically, one half of the mold is the cavity or "A" side of the mold and the other side of the mold is the core side or "B" side of the mold. Leader pins or posts on the "A" side of the mold stand straight up and are aligned with or parallel to the mold open/close direction of the mold. When assembled in the closed position, the leader pins are typically aligned within holes and standard bushings located on the "B" side. The angle pins would then also be on the "A" side of the mold and would align with the holes or slots in the slide parts. The slides may typically move toward one another and as the mold closes. The size and productivity of the mold tool can vary widely, depending on the size and complexity of the parts, and thus the mold cavities. In one example, a mold can be a four-cavity tool with two opposing slides. In another example, the mold can have a dozen or more cavities and numerous complex slides. As noted above, the mold tools can be on the order of hundreds of pounds or can be on the order of thousands of pounds. The disclosed angle pin bushings are not intended to be limited to any particular mold type, size, or arrangement.

Although certain angle pin bushing components, aspects, features, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:
1. A mold slide comprising:
a slide part having a slide body movable along a first direction, the slide body having an angle pin hole formed therein and defining an axis, the angle pin hole having a pocket at one end thereof;
an angle pin bushing seated in the pocket and defining an angle pin bore that is parallel to the axis of the angle pin hole;

a mold part adjacent to the slide part and movable relative to the slide part along a second direction different from the first direction; and an angle pin carried on the mold part, a portion of the angle pin positioned in and movable in concert with the mold part relative to the angle pin bore in the angle pin bushing, wherein the first direction and the second direction are each not parallel and not perpendicular with the axis of the angle pin hole, wherein, when the mold part is moved toward a mold closed position in the second direction, the angle pin bears against the angle pin bushing driving movement of the slide part toward the mold closed position in the first direction, wherein, when the mold part is moved toward a mold open position in the second direction, the angle pin bears against the angle pin bushing driving movement of the slide part toward the mold open position in the first direction, and wherein the angle pin bushing has a scalloped region on a portion of an exterior surface of the angle pin bushing, the scalloped region defining a step on the exterior surface of the angle pin bushing.

2. The mold slide of claim 1, wherein the slide part and the mold part are part of an injection mold tool.

3. The mold slide of claim 1, wherein the second direction is perpendicular to the first direction.

4. The mold slide of claim 1, wherein the angle pin is oriented parallel to the axis of the angle pin hole and wherein the axis is oriented at an angle greater than 0 degrees and less than 90 degrees relative to the first and second directions.

5. The mold slide of claim 1, wherein the angle pin hole is a circular cross-section shape.

6. The mold slide of claim 5, wherein the angle pin bore of the angle pin bushing is a generally circular cross-section shape.

7. The mold slide of claim 1, wherein the angle pin hole is a slot having a non-round oval or oblong cross-section shape.

8. The mold slide of claim 7, wherein the angle pin bore of the angle pin bushing is a slot having a non-round oval or oblong cross-section shape.

9. The mold slide of claim 1, wherein the pocket has a larger width than a remainder of the angle pin hole and defines a shoulder at a terminus of the pocket adjacent the remainder of the angle pin hole, and wherein the angle pin bushing is borne against the shoulder within the pocket.

10. The mold slide of claim 9, wherein the angle pin bushing has a top face that is flush and parallel with a top surface of the slide part surrounding the angle pin hole.

11. The mold slide of claim 1, wherein a clip recess is formed adjacent the pocket and has a depth corresponding to the position of the step, and
wherein a retention clip is received and retained within the clip recess and abuts against the step to retain the angle pin bushing within the pocket of the angle pin hole.

12. The mold slide of claim 1, wherein the angle pin bushing is formed from a fabric and resin composite material.

13. The mold slide of claim 1, wherein the angle pin bushing has an elongate slit formed along a length of the angle pin bushing and through the angle pin bushing from an exterior surface of the angle pin bushing to the angle pin bore.

14. The mold slide of claim 1, wherein the angle pin bushing has a flat surface region formed on an exterior surface of the angle pin bushing at each of opposed sides of the angle pin bushing.

15. A mold slide comprising:
a slide part having a slide body movable along a first direction, the slide body having an angle pin hole formed therein and defining an axis, the angle pin hole having a pocket at one end thereof;
an angle pin bushing seated in the pocket and defining an angle pin bore that is parallel to the axis of the angle pin hole;
a mold part adjacent to the slide part and movable relative to the slide part along a second direction different from the first direction; and
an angle pin carried on the mold part, a portion of the angle pin positioned in and movable in concert with the mold part relative to the angle pin bore in the angle pin bushing,
wherein the first direction and the second direction are each not parallel and not perpendicular with the axis of the angle pin hole,
wherein, when the mold part is moved toward a mold closed position in the second direction, the angle pin bears against the angle pin bushing driving movement of the slide part toward the mold closed position in the first direction,
wherein, when the mold part is moved toward a mold open position in the second direction, the angle pin bears against the angle pin bushing driving movement of the slide part toward the mold open position in the first direction, and
wherein the angle pin bushing has a lead-in relief section at one end thereof, the lead in relief section including a chamfer at a bottom surface of the slide body.

16. The mold slide of claim 1, wherein the axis of the angle pin hole, the angle pin bore of the angle pin bushing, and the angle pin are each oriented concentric with one another.

17. A mold slide comprising:
a slide part having a slide body movable along a first direction, the slide body having an angle pin hole formed therein and defining an axis, the angle pin hole having a pocket at one end thereof;
an angle pin bushing seated in the pocket and defining an angle pin bore that is parallel to the axis of the angle pin hole;
a mold part adjacent to the slide part and movable relative to the slide part along a second direction different from the first direction; and
an angle pin carried on the mold part, a portion of the angle pin positioned in and movable in concert with the mold part relative to the angle pin bore in the angle pin bushing,
wherein the first direction and the second direction are each not parallel and not perpendicular with the axis of the angle pin hole,
wherein, when the mold part is moved toward a mold closed position in the second direction, the angle pin bears against the angle pin bushing driving movement of the slide part toward the mold closed position in the first direction,
wherein, when the mold part is moved toward a mold open position in the second direction, the angle pin bears against the angle pin bushing driving movement of the slide part toward the mold open position in the first direction, wherein the axis of the angle pin hole, the angle pin bore of the angle pin bushing, and the angle pin are each oriented concentric with one another, and wherein a retention clip is received in a clip recess adjacent the pocket and abuts against a step on the angle pin bushing, wherein a fastener hole through the retention clip and a fastener bore in the slide body receive a fastener that retains the angle pin bushing within the pocket, and wherein the fastener hole and fastener bore also each having an axis that is at least parallel with the axis of the angle pin hole.

18. The mold slide of claim 1, wherein the angle pin bushing is formed from a bronze material or an aluminum bronze material.

* * * * *